US008911632B2

(12) United States Patent
Järvinen (10) Patent No.: US 8,911,632 B2
(45) Date of Patent: Dec. 16, 2014

(54) DEVICE, METHOD AND VESSEL FOR PREVENTING OIL DAMAGES AND ALLEVIATING DAMAGES

(75) Inventor: Markku Järvinen, Lielax (FI)

(73) Assignee: Oilwhale Oy, Lielahti TL (FI)

( * ) Notice: Subject to any disclaimer, the term of this patent is extended or adjusted under 35 U.S.C. 154(b) by 602 days.

(21) Appl. No.: 13/145,446

(22) PCT Filed: Jan. 19, 2010

(86) PCT No.: PCT/FI2010/050025
§ 371 (c)(1),
(2), (4) Date: Oct. 4, 2011

(87) PCT Pub. No.: WO2010/084247
PCT Pub. Date: Jul. 29, 2010

(65) Prior Publication Data
US 2012/0248043 A1    Oct. 4, 2012

(30) Foreign Application Priority Data

Jan. 21, 2009    (FI) ...................................... 20095047
Feb. 20, 2009    (FI) ...................................... 20095168

(51) Int. Cl.
*E02B 15/04*        (2006.01)
*B63B 35/32*        (2006.01)
*C02F 103/00*       (2006.01)

(52) U.S. Cl.
CPC ........... *B63B 35/32* (2013.01); *C02F 2103/007* (2013.01); *E02B 15/048* (2013.01); *E02B 15/047* (2013.01); *Y10S 210/923* (2013.01)
USPC .................... 210/747.6; 210/776; 210/170.05; 210/170.11; 210/242.3; 210/923

(58) Field of Classification Search
CPC ... E02B 15/046; E02B 15/047; E02B 15/048; E02B 15/10; B63B 35/32; C02F 2103/007

USPC .................... 210/747.6, 776, 170.05, 170.09, 210/170.11, 242.3, 923
See application file for complete search history.

(56) References Cited

U.S. PATENT DOCUMENTS 3,618,768 A * 11/1971 Brown .......................... 210/776
3,700,108 A * 10/1972 Richards .................... 210/242.3
(Continued)

FOREIGN PATENT DOCUMENTS

FI    57996    7/1980
FI    80746    9/1988
(Continued)

OTHER PUBLICATIONS

International Search Report for PCT/FI2010/050025, mailed Apr. 22, 2010.

(Continued)

*Primary Examiner* — Christopher Upton
(74) *Attorney, Agent, or Firm* — Nixon & Vanderhye P.C.

(57) ABSTRACT

The invention relates to an oil combating boom (1), which comprises an elongated boom part, which at its first end is connectable to an oil combating vessel (10). At least one pontoon member (5) and a number of turnable transfer members (6) equipped with rotating blade members (9) have been arranged in connection with the elongated boom part. The invention further relates to a method for collecting oil from a polluted shore area, in which method an oil combating vessel is steered to the vicinity of the shore, the oil combating boom (1) is arranged to extend onto the polluted shore area, oil is transferred from the shore area into the water and steered in the water towards the final collecting space (11) by rotating the blade members (9) of the transfer members (6). Also disclosed is a device and a method for separating oil from ice blocks and collecting oil from an icy water system, in which a floatable frame with a separation grate (18) presses ice blocks (16) at least partly under the water surface in order to separate oil from ice blocks. Support part (19) is pivotably connected to the separating grate and the frame for altering the elevation and angle of the separating grate in relation to the level of the water surface of the water system.

12 Claims, 6 Drawing Sheets

(56) References Cited

U.S. PATENT DOCUMENTS

| | | | |
|---|---|---|---|
| 4,033,869 A * | 7/1977 | McGrew | 210/242.3 |
| 4,264,444 A * | 4/1981 | Bronnec | 210/242.3 |
| 4,747,361 A | 5/1988 | Lundin | |
| 4,831,955 A | 5/1989 | Lundin | |
| 4,976,855 A | 12/1990 | Virtanen | |
| 5,022,987 A | 6/1991 | Wells | |
| 5,045,216 A * | 9/1991 | Eller | 210/776 |
| 5,045,217 A | 9/1991 | Ronan et al. | |
| 5,102,540 A * | 4/1992 | Conradi et al. | 210/242.3 |
| 5,122,283 A | 6/1992 | Wells | |
| 6,592,765 B1 | 7/2003 | Mykkanen | |
| 7,297,259 B2 * | 11/2007 | Zori Garcia | 210/242.3 |
| 2008/0219771 A1 | 9/2008 | Jarvinen | |

FOREIGN PATENT DOCUMENTS

| | | |
|---|---|---|
| NL | 7812527 | 6/1980 |
| SU | 1204477 A | 1/1986 |
| WO | WO 2007/010086 | 1/2007 |
| WO | 2008/040839 | 4/2008 |

OTHER PUBLICATIONS

Written Opinion for PCT/FI2010/050025, mailed Apr. 22, 2010.
Non-English FI Office Action for FI 20095047, dated Nov. 11, 2009.
Non-English FI Office Action for FI 20095168, dated Nov. 25, 2009.

* cited by examiner

DEVICE, METHOD AND VESSEL FOR PREVENTING OIL DAMAGES AND ALLEVIATING DAMAGES

This application is the U.S. national phase of International Application No. PCT/FI2010/050025 filed 19 Jan. 2010 which designated the U.S. and claims priority to FI Patent Application No. 20095047 filed 21 Jan. 2009 and FI Patent Application No. 20095168 filed 20 Feb. 2009, the entire contents of each of which are hereby incorporated by reference.

TECHNICAL FIELD OF THE INVENTION

The object of the invention is an oil combatting boom, an oil combatting vessel and a method for collecting oil according to the preambles of the independent claims presented below. The invention especially relates to a new effective way of collecting oil from shore areas and open water areas of a water system. The object of the invention is also a device and a method for separating oil from ice blocks and collecting it from an icy water system according to the preambles of the independent claims presented below. The invention thus also relates to a new effective manner of separation in order to combat oil damages which have taken place in icy circumstances.

PRIOR ART

Collecting oil which has ended up in a water system is especially difficult when a part of the oil has drifted ashore. There can be oil both in the low coastal waters and on land. There can be oil among the shore vegetation or for example adhered to the surface of rocks. There are nowadays not sufficiently effective methods with low costs available for cleaning oil-polluted shores and coastal waters.

Known mechanical techniques for collecting oil from shores and coastal waters are mostly based on the use of brushes, shovels, scoops or absorptive materials. Known methods usually require a lot of manual labour and are therefore not sufficiently effective. People who come in contact with the oil need to protect themselves in an appropriate manner. The cost of disposing of oil-polluted materials and collecting means can also become high. When using methods that require a lot of manual labour, the oil damage site must also be easily accessible by land, whereby the cleaning of uninhabited areas and areas behind roadless parts becomes a problem. The cleaning of archipelago areas formed of several different islands and islets is also difficult, partly even impossible.

In some solutions it has been attempted to collect oil with the aid of various pressurized water jets. Such methods might result in unwanted oil emulsion, which is more difficult to handle. Additionally such a method may even push the oil deeper, beneath the ground surface.

Collecting oil which has ended up in a water system is also especially difficult when there is ice in the water system. There may for example be oil on the surface of ice blocks or among ice sludge, whereby an amount of ice, which is harmful for the operation of the oil collecting equipment, may be collected along with the oil. Even if the passing of ice into the oil collecting device could be prevented, the removing of the oil from the ice surface can become a problem. Cleaning oil-polluted, icy water system areas using the current methods is difficult, slow and inefficient.

Publication FI106969 presents a method and a device for collecting oil among ice blocks. In the method the ice blocks are pushed under water along the slanting surface of a screen or a grid attached to the vessel. The oil is separated from the blocks by vibrating the slanting surface formed by the screen, and the oil which has risen to the water surface above the screen is collected.

Publication FI80746 presents an arrangement in a vessel for collecting oil at the water surface, among ice blocks. The arrangement comprises a bow part, the planar lower surface of which is low-gradient and equipped with intake openings for water which contains impurities. The vessel is equipped with separating devices for separating impurities from the entering water. When the vessel drives forward, the ice blocks are pushed beneath the lower surface of the bow part. The bow part is arranged separate from the frame as a part that can be lifted and lowered in relation to the frame.

In the methods presented in both of the above-mentioned publications, when pushing ice with the devices beneath the water, the oily ice blocks out of reach for the devices, on its sides, move along with flow of the water to above the device and the oil that has been detached with the method again adheres to the ice blocks, which come from the sides. A problem is further that present collecting methods, so-called skimmers and brush devices, cannot endure ice sludge at all, but ice blocks must be melted before oil, which is attached to them, can be handled.

A known problem is further that when melting oily ice with hot water or steam, an emulsion of water and oil is formed, which cannot be separated sufficiently quickly in collecting conditions with present techniques.

Prior art solutions further have a problem in that the oil needs to be pumped, lifted or otherwise moved in order to get it out of the water system. For example pumping cold, congealed oil is difficult and often impossible. So-called collecting brushes are difficult or impossible to get to collect congealed oil effectively.

OBJECT AND BRIEF DESCRIPTION OF THE INVENTION

It is an object of the present invention to reduce or even eliminate the above-mentioned problems appearing in prior art.

It is an object of the present invention to provide a low-cost solution for collecting oil from the shore areas and/or open water areas of a water system.

It is an object of the present invention to provide an effective and easy-to-use solution for collecting oil from the shore areas of a water system.

It is still another object of the present invention to provide a solution, which makes possible the cleaning of shore areas of a water system also in areas, where cleaning personnel and devices cannot be transported by land.

It is especially also an object of the present invention to make the collecting of oil from an icy water system easier.

In order to realize for instance the objects mentioned above, the devices, methods and vessels according to the invention are characterized by what is presented in the characterizing parts of the enclosed independent claims.

A typical oil combatting boom according to the invention comprises an elongated boom part, which at its first end is connectable to an oil combatting vessel, whereby at least one pontoon member and a number of turnable transfer members equipped with rotating blade members, have been arranged in connection with the elongated boom part.

At least one oil combatting boom according to the invention has been arranged in connection with a typical oil combatting vessel according to the invention.

In a typical method according to the invention for collecting oil from an oil-polluted shore area
- an oil combatting vessel equipped with an oil combatting boom according to the invention is steered to the vicinity of a shore,
- the oil combatting boom is arranged to extend to the oil-polluted shore area,
- oil is transferred from the shore area into the water by rotating the blade members of the transfer members,
- the oil is steered in the water toward a final collecting space by rotating the blade members.

Now it has surprisingly been discovered that the collecting of oil from hard-to-reach shore areas can be performed with an oil boom equipped with transfer members and a pontoon member. With the aid of the rotating blade members of the transfer members the oil can be flung and transferred from the shore area back into the water. In the water the oil ends up in the area delimited by the oil boom supported by the pontoon member, and with the aid of the flows generated by the rotating blade members of the turnable transfer members arranged in the oil boom the oil can be steered toward a final collecting space, for example a cargo space of the oil collecting vessel. In this way oil can easily be cleaned also from a hard-to-reach shore area, by bringing the oil, which has ended up on the shore, back into the water, from where the collecting is easier than from land. With the solutions according to the invention it is also possible to widen the wiping i.e. collecting width, since the surface flow generated by the transfer members can reach outside the area delimited by the oil boom.

In this application the term water system means for example a sea, lake, river or the like. By shore area is meant the land area, which is closest to the water line, being limited on average to a distance of about 0.5-10 meters from the water line, typically a distance of 1-5 meters from the water line, very typically a distance of 1-3 meters from the water line.

In this application transfer member means a member, with which oil can be transferred from a first place to a second place. In a solid shore area the transfer takes place when the rotating blade members of the member come into contact with oil and throw it forward in the rotating direction of the blade members due to the rotating movement. In water the transfer member generates a flow, with the aid of which oil can be transferred in a desired direction.

The boom part of the oil combatting boom is elongated and it is typically manufactured from a rigid material, for example steel. At its first end the boom part is attached to the hull of a suitable vessel, for example by pivoting or in another suitable manner of attachment. The boom part can be equipped with power means, with the aid of which it is movable. The boom part can be moved with the power means freely in three dimensions in relation to the hull of the vessel, both in a horizontal and a vertical direction. The power means can for example be a hydraulic power means, such as a hydraulic cylinder. An advantage of hydraulic power means is that they do not generate a risk of sparking in oil combatting circumstances, which limits the use of electric devices and means.

The length of the boom part can vary according to the use area and purpose, when collecting in open water the boom part can be longer and when cleaning shore areas shorter. The length of the boom part can be 5-50 m, typically 10-20 m, on average about 12-17 m.

In order to make operation near a shore area possible, the boom part of the oil combatting boom is attached to a suitable vessel, the draught of which is sufficiently small. The required draught naturally depends on the conditions of the shore area to be cleaned, for example on the steepness of the shore below the water line. One example of a suitable vessel is presented in patent publication FI 20040062, or it may be a catamaran-type vessel, or an offshore vessel, which is equipped with an oil collecting device. It is clear that several oil combatting booms according to the invention can if necessary be attached to the vessel, either on both sides of the hull of the vessel or several booms one after another on the same side of the hull of the vessel, by adding pontoons, which carry the boom, if necessary.

At least one pontoon member has been arranged in connection with the oil combatting boom, for carrying the boom on the water surface or above it. Preferably the pontoon member carries the boom so that it is situated above the water surface. This makes it possible to collect oil also in windy weather, because the waves do not disturb the function of the boom, but they can freely pass over or under the boom. The boom does not need to be in contact with the water surface, because the oil-controlling and oil-limiting effect is in the present invention not mainly achieved by the boom, but is due to the effect of the transfer members. Thus a significant collecting speed is also achieved, because the waves do not slow down the travel of the boom, and with the aid of the transfer members the continuous surface flow can be steered in the direction of the collecting device regardless of the waves. The generated flow also dampens waves, which increases the collecting speed.

According to an embodiment of the invention, the elevation of the oil combatting boom from the water surface can be adjusted with the aid of the pontoon member, and at the same time the distance from the water of the transfer members arranged to the boom is adjusted. Depending on how deep from the water surface the transfer members are situated, different flows are generated at different depths. Thus optimal flow conditions for the moving and steering of the oil to be collected can be ensured. The attachment member between the pontoon member and the boom can for example be telescopic or arranged with joints, so that the elevation of the boom in relation to the water surface can be altered.

A number of turnable transfer members have been arranged in connection with the oil combatting boom, below the oil combatting boom, on the side toward the water surface. The transfer members can with the aid of a shaft be arranged in connection with the boom part and/or the extension part. The length of the shaft is typically 0.35-1.5 meters, typically about 0.5-1 meters. Typically one transfer member can be arranged to the boom, for every distance of about 5 meters. Typically the boom thus comprises about 1-6 transfer members. The transfer members can be arranged at even distances from each other or they can be grouped, so that in some parts of the boom the distance between the blade members is shorter than in another part of the same boom. The transfer members can for example be propellers, which have blades. The transfer members can also be screw-like threads, which have a flexible axis. The transfer members can for example be manufactured of a flexible material or brush elements. The boom can for example have rigid blades for generating surface flows, and especially in the part of the boom, which extends to the land area, there can be for example flexible blades or screw-like threads manufactured from brush elements.

The transfer members are turnable in a desired direction, so that the flows generated with the transfer members would be in the right direction, and would steer oil away from the shore area into the water system and from there toward the collecting space. In an embodiment a ball joint, reversal joint or the like can have been arranged in the connection point of the oil combatting boom and the transfer member, which joint makes possible the turning of the shaft around its longitudinal axis. The transfer member can thus be turned by up to 180 degrees in either direction, typically at least 45 degrees, more typically at least 60 degrees, very typically 90 degrees. Alternatively the transfer member can have been arranged to be turnable at the connection point of the transfer member and its shaft, whereby the transfer member can be turned around the axis of the shaft by typically at least 45 degrees, more typically at least 60 degrees, very typically 90 degrees. By adjusting the transfer members into a suitable position, the force generated by their flows can also be used for boosting or facilitating the steering of the collecting vessel itself. The transfer members can when needed also be turned in a vertical direction. The transfer members can be turned for example 10-40 degrees, more typically 20-30 degrees upward or downward in a vertical direction. Thus the flows created by the transfer members can when needed be directed in a vertical direction. The flows created by the transfer members can in this way for example be directed to carry the boom.

According to an embodiment of the invention the longitudinal axis of the transfer member is in the standby mode mainly horizontal.

A typical transfer member is a propeller member, which is equipped with normal propeller blade-like blade members. The blade members are thus generally flat planar objects, which have a certain surface area. The propeller blade-like blade member can measured from the outer edge to the outer edge be for example 0.5-2 meters, typically 1-1.5 meters. In an embodiment the transfer member can be an elongated bar-like member, which is manufactured from a flexible material. A planar blade member can be attached in a twisted manner to the outer surface of the bar-like flexible member, i.e. the blade member can twist in a screw-like manner around the flexible axis of the bar-like transfer member. The screw-like blade member can be manufactured from a uniform flexible material, such as rubber, or it can comprise bristles attached to the bar-like transfer member in a screw-like manner. The measurement of the screw-like blade member in the radial direction does not have to be constant in the entire transfer member, but it can vary. The length of the screw-like blade member can for example be 0.5-2 meters, typically 0.5-1 meters.

In a preferable embodiment of the invention the transfer member comprises a motor member, with the aid of which the blade members are rotated. According to an embodiment of the invention the axis of the transfer member is in the standby mode mainly horizontal. The axis of the transfer member thus travels horizontally through the connection point of the blades. The motor member of the transfer member is typically arranged in the immediate vicinity of the blade members, usually so that is it situated on the axis of the transfer member. Each transfer member can have its own motor member, and the motor members of the transfer members can be controlled and adjusted independently from each other, or the transfer members of the boom can be divided into groups, which are adjusted and controlled independently from each other. Thus flows and/or rotation speeds, which are as optimal as possible, can be ensured for transferring the oil into the water and for transporting it towards the collecting space. Typically the motor member is adjustable in a stepless manner and its typical adjustment interval varies in the area 0-1000 rpm. The motor member can for example be a hydraulic motor.

According to an embodiment of the invention, in at least a part of the transfer members, the blade members are manufactured from a flexible material, such as rubber or the like, which facilitates the cleaning of an uneven and/or stony shore area. The blade members of all the transfer members arranged in connection with the oil combatting boom can be of a flexible material, but it is possible that transfer members, the blade members of which are manufactured from a flexible material, and transfer members, the blade members of which are manufactured from an inflexible material, have been attached to the boom. Preferably at least the blade members of the transfer members situated the farthest from the first end of the boom, i.e. from the hull of the vessel, are manufactured from a flexible material. Thus it can be ensured that at least the blade members of those transfer members, which come into contact with the solid shore area, are manufactured from a flexible material, and the blade members of those transfer members, which are closest to the hull of the vessel, are manufactured from an inflexible material.

In an embodiment, the blade members of the transfer members, which are situated farthest from the first end of the boom, i.e. from the hull of the vessel, are manufactured from a flexible material, and the structure of the blade members is bristle-like, i.e. they comprise elongated flexible filaments or bristles. Thus the outer transfer members can be brush-like, whereby the cleaning of a solid shore area is further intensified.

In an embodiment of the invention an elongated extension part has been arranged in the second end of the boom part, which extension part is at least partly arrangable inside the boom part in a telescopic manner. Thus the length of the oil combatting boom can be adjusted as necessary. The extension part is manufactured from a suitable rigid material, for example steel. Preferably the extension part can be manufactured from the same material as the boom part. The length of the extension part is in a use situation typically 5-15 meters, more typically 7-12 meters, quite often about 10 meters. The total length of the oil combatting boom, i.e. the combined length of the boom part and the extension part is in a use situation 15-40 meters, typically 15-35 meters, more typically 20-30 meters.

In an embodiment of the invention the boom part and/or extension part is pivoted at one or more spots, so that they are flexible in the vertical direction. With the aid of the pivoting, the second end of the oil combatting boom can be made to better follow the shapes of the shore area to be cleaned. With the aid of the pivoting, a part of the oil combatting boom can even turn in an angle of nearly 90 degrees, if the shore area to be cleaned is very steep.

The pontoon member can be attached either to the boom part or the extension part. Gears, rollers, wheels, drums or other corresponding means can be arranged beneath the pontoon member, if it is regarded as necessary. Such means may facilitate the moving forward of the pontoon member, if it comes into contact with the solid shore area or the bottom of a shallow water system.

In an embodiment the extension part can have been arranged to be like a slide rail, i.e. the transfer members and the possible pontoon member arranged in connection with the extension part can move to different parts of the extension part. When the total length of the oil combatting boom is minimized, i.e. the extension part is retracted in a telescopic manner as far as possible into the boom part, the transfer members and pontoon member of the extension part slide along it to its other end, where they arrange themselves sequentially. When the total length of the oil combatting boom is increased by bringing the extension part out of the boom part, the transfer members and the pontoon member diverge from each other by sliding along the extension part and settle in their final places.

The means, hoses and other power transfer means needed for turning the transfer members and controlling their motor members are preferably arranged to run inside the boom part and the extension part, where they are protected from the strains of outside conditions.

According to an embodiment of the invention the oil combatting vessel is steered to travel along the shore area, and at the same time oil is continuously transferred into the water from the polluted shore area with the outer transfer members. Oil, which has deposited on the shore, can for example be swept or brushed back into the water system within the reach of the oil combatting booms, when the oil combatting vessel travels along the shore area of the water system. Oil which has collected on the shore can have been deposited before the collecting with absorbing substances, which can have been spread onto the shore area for example with an airplane or a helicopter. The transfer members are able to transfer or fling thus formed oily lumps into the water, from where they are steered into the collecting space with generated artificial flows. Thus the collecting of oil can be further intensified.

According to an embodiment of the invention the oil combatting vessel is immobile in the water system, in relation to the shore, when collecting oil. Oil can thus be transferred back into the water system within the reach of the oil combatting booms. The oil can be flung or transferred into the water with transfer members, from where the oil is steered into the collecting space with the generated artificial flows. The oil collecting can be intensified by moving the booms in a sideways direction, for example by moving the booms sideways back and forth.

The transfer members can also be used to remove polluted vegetation from a shore area, especially when the transfer members are propeller members. According to an embodiment of the invention, oil-polluted vegetation growing in the water close to the shore area or in the shore area is cut down with the aid of the propellers of the propeller members and the cut vegetation is transferred into the water together with the oil and from there toward the final collecting space. Thus for example an oil-polluted reed area can easily be processed. The propeller blades of the propeller members arranged in the booms can be used as cutting blades by tilting the propeller members at a suitable angle. It is also possible to attach separate cutting means equipped with rotating blades to the oil combatting boom, if this is regarded as necessary. The cutting means can be arranged at a desired location on the boom, preferably closer to its second end. The cut vegetation is transferred into the water and in the water it is steered into the collecting space with the surface flows generated with the transfer members. The vegetation moved to the collecting space can for example be baled or otherwise compressed in order to increase the transport capacity.

In an embodiment, oil combatting booms according to the invention can be used to brush oil from ice, for example oil among ice blocks in a shipping lane can be brushed off and steered into a collecting vessel or space with the aid of generated flows. This solution described in the application can be used for example with the solution presented in application FI20095047, whereby oil is brushed off with the oil combatting booms attached to the vessel before the ice ends up below the so-called separating grate. Thus the achievable collecting result is improved.

In an embodiment of the invention, oil combatting booms according the invention can be used for collecting oil also at open sea, far from the closest shore area. When an oil damage occurs at open sea, the surface area of the oil slick floating on the sea surface is often remarkable, even several square kilometers, but its thickness can be just a few millimeters. The oil combatting boom according to the invention can be used at open sea to increase the thickness of an oil slick and to reduce its surface area, which significantly facilitates and intensifies the removal of the oil from the sea surface. With the aid of the flows achieved with the oil combatting booms the oil from the oil slick can be transferred from the edges of the oil slick toward its center, whereby the thickness of the slick simultaneously grows. The vessel equipped with oil combatting booms thus moves along the edge of the slick, while the oil combatting booms and their transfer members are arranged in such a position that the flows achieved with the transfer members are directed toward the center of the slick. It is also possible that several vessels equipped with oil combatting booms according to the invention participate in the collecting work, whereby the vessels can move at a suitable distance from each other in the same direction in a triangular formation or an arched formation. The direction of the surface flows achieved with the booms of the vessels moving first at the edges of the formation moves the oil backwards in the formation toward the vessel moving in the middle of the formation, whereby the surface area of the oil slick to be collected is compressed and the collecting is intensified.

The solutions according to the invention can thus be used to increase the collecting width, i.e. the sweeping area, since the surface flow achieved with the transfer members extends to both sides of the propeller members and simultaneously outside the area delimited by the boom carrying the transfer members.

In addition to oil, also other unwanted and/or environmentally harmful material, which has accumulated onto the shore or in the vicinity of the shore, can be collected with the oil combatting boom according to the invention.

In an embodiment of the invention the collecting effect and flow achieved by the transfer members can be intensified with water jets. Thus a number of nozzle members have been arranged at a distance from each other on the boom part and/or extension part, which nozzle members provide oil-steering water jets. In this embodiment the power of the water jets can be controlled in a precise manner, to avoid the formation of water-oil emulsion.

The invention also relates to a device and a method for separating oil from icy water.

A typical device according to the invention for separating oil from ice blocks and for collecting it from an icy water system comprises a frame, which is arranged to float in the water system, a separating grate for pushing the ice blocks at least partly below the water surface of the water system and a support part pivotably connected to the separating grate and the frame, for altering the elevation and angle of the separating grate in relation to the level of the water surface of the water system.

A typical method according to the invention for separating oil from ice blocks and for collecting it from an icy water system comprises at least the following stages a cargo space is moved in the water system in relation to the surface of the water system, ice blocks are pushed with a separating grate, which grate is arranged above the ice blocks and which comprises rails arranged at a suitable distance from each other, in order to remove oil from the ice blocks, the elevation and angle of the separating grate in relation to the level of the water surface of the water system is controlled to be as desired by moving a support part, which is pivotably connected to the grate and to the device.

In a typical method according to the invention oil is led from the water system into the cargo space via an intake opening, which intake opening is situated at least partly below the water surface of the water system and in front of which intake opening the separating grate is arranged.

Collecting oil from a water system is especially difficult if the oil has been mixed up with ice. There can for example be oil on the surface of the ice blocks, under or on top of the ice or among ice sludge. It has now been discovered that oil collecting from an icy water system can be intensified by pushing the ice blocks with a separating grate according to the invention, the elevation and angle of which can be controlled with a support part. By controlling the elevation and angle of the separating grate the ice can be pushed in a suitable manner, so that the ice blocks slide downwards, and do not accumulate in front of the separating grate. The device and method according to the invention are especially suitable for use in collecting oil in a water system, which has ice blocks and/or ice sludge, such as for example in the vicinity of the edge of fast ice, in shore areas or in shipping lanes broken from fast ice.

In this application the term water system means for example a sea, lake, river or the like.

In addition to oil, other materials can also be collected with the aid of the invention, such as for example bilge water from ships. It could also be conceived that oil and other materials could be collected with the aid of the invention from among other unwanted matter than ice, for example among logs or other timber products.

A typical device according to the invention can be a watercraft, which comprises motion power means such as an engine, and steering means for moving the device independently on the surface of the water system. Alternatively, a typical device according to the invention can comprise attaching means for connecting a separate source of motion power, e.g. a pusher towboat, to the device. These attaching means can be alike to those used in so-called pusher barges.

A typical separating grate according to the invention is pivotably connected to the support part. The separating grate is arrangable for example in the vicinity of the bow or the side of the device. For example hinges and/or hydraulic cylinders can be arranged between the separating grate and the support part. The shape of the separating grate can for example be polygonal or a part of a circular arch. The separating grate can for example be shaped mainly as a rectangle or a square. The separating grate can further mainly be shaped as a rectangle or square and/or the front part of the separating grate can be wedge-like or a part of a circular arch. The structure of the separating grate can be for example of O-profile, i.e. hollow beam. With the aid of the separating grate ice blocks can be pushed at least partly below the water surface, whereby at least a part of the oil detaches from the ice blocks and is left on the water surface. The elevation and angle of the separating grate in relation to the water surface can be altered for example by moving the support part or turning the separating grate, which is pivotably attached to the support part. The separating grate can be dimensioned for example to be slightly wider than the intake opening of the cargo space or the width of the separating grate can be for example 2m, 5 m, 10 m, 15 m or 20 m or 1-25 meters, 2-5 meters, 6-10 meters or 15-20 meters. The length of the separating grate can be for example 2m, 5 m, 10 m, 15 m, 20 m or 1-30 meters, 2-5 meters, 10-15 meters or 20-25 meters. The angle and elevation of the separating grate in relation to the water surface of the water system are preferably such that ice slides along the separating grate beneath the water surface. From under the separating grate and the device, ice blocks are returned into the free water space, for example behind and to the sides of the device. The separating grate can during oil collecting be held at an angle of for example 30°, 45°, 60° or 25°-75°, 25°-35°, 40°-50°, or 55°-65° in relation to the water surface of the water system. Typically the front edge of the separating grate is held above the surface of the water system during oil collecting.

A small amount of ice or ice sludge which has ended up in the cargo space does not typically impede the function of the invention. Ice sludge which has ended up in the cargo space can be slowly melted for example with the aid of the technique mentioned in publications FI20040062 or WO 2007/010086, whereby water which is warmer than the ice continuously flows into the cargo space. In certain conditions it takes about 25 cubic meters of +4° C. water to melt one cubic meter of ice. In the method presented in the above-mentioned publication, water flows through the cargo space back into the sea for example at 100-10000 cubic meters per hour, depending on the collecting situation and the size of the collecting vessel. Thus the ice sludge accumulated in the cargo space can be melted during the collection. When rinsing oily ice blocks with cold water, only a little or no water and oil emulsion at all is formed. Also oil emulsion can be collected with the method presented in the above-mentioned publication.

A typical support part according to the invention is pivotably connected to the separating grate and the frame of the device. The support part can be attached for example in connection with the side or the bow of the device. For example hinges and/or hydraulic cylinders can be arranged between the support part and the frame. With the aid of the support part pivotably connected to the separating grate and the frame, the elevation and angle of the separating grate in relation to the water surface can be adjusted to be suitable. The support part is during oil collecting preferably held at such a position that the separating grate, which is respectively pivotably connected to the support part, is at a preferable depth and a preferable angle in relation to the level of the water surface of the water system. The support part can during oil collecting be held at an angle of for example 30°, 45°, 60° or 25°-75°, 25°-35°, 40°-50°, or 55°-65° in relation to the water surface of the water system. The support part can during oil collecting also be essentially parallel in relation to the water surface of the water system. When collecting oil, the support part can be situated completely below the water surface of the water system.

According to an embodiment of the invention there are mainly vertical brinks on the sides of the separating grate, the upper edge of which extends above the water surface of the water system. The structure of the brinks can be the same as that of the bottom of the separating grate, letting oil flow from the gaps in the brinks into the cargo space, but preventing ice blocks from returning onto the separating grate and from there into the cargo space. The separating grate can be dimensioned according to the width of the cargo space, so that ice blocks cannot get into the cargo space from the sides of the separating grate, around the above-mentioned brinks.

According to an embodiment of the invention there is a cargo space in the frame, whereto an intake opening leads, which intake opening is arranged at least partly below the water surface of the water system and the separating grate is arrangable in front of the intake opening to prevent ice from entering the cargo space. The separating grate can be positioned in front of the intake opening for example so that the brinks constructed at the sides of the cargo space function as an obstacle for ice blocks trying to enter the cargo space from the sides of the separating grate. The lower edge of the intake opening of the cargo space can be for example 5 cm, 20 cm, 30 cm or 40 cm or 5-70 cm, 10-60 cm or 15-40 cm below the water surface of the water system. The cargo space can be for example 10-120 meters long, 3-25 meters wide and 1-5 meters high. It is also possible that the front edge of the cargo space is during oil collecting open mainly along its entire height. Thus the lower edge of the intake opening of the cargo space is approximately at the level of the bottom of the cargo space. The width of the intake opening of the cargo space can be for example 2-30 m, depending on the size of the cargo space. The width of the intake opening can be for example 60-80% of the length of the cargo space. The cargo space, wherein oil is collected, can for example be a watercraft resembling an ordinary barge. The cargo space can for example also be a floating storage tank. The floating storage tank can be connected for example to a watercraft resembling an ordinary barge. The cargo space can comprise various means necessary for collecting oil, such as for example means for removing water from the cargo space.

According to an embodiment of the invention, the surface of the water system and material to be collected therein is led through the intake opening directly into the cargo space.

According to an embodiment of the invention, when collecting material from a water system, the surface of the water and the material to be collected is at the same height as the surface of the water system surrounding the cargo space.

According to an embodiment of the invention, when transferring material to be collected from the water system into the cargo space, it does not need to be pumped at all or otherwise mechanically lifted or transported. The surface part of the water system and the material therein to be collected flow in through the intake opening, due to the relative movement between the device and the water system or the surface part thereof.

According to an embodiment of the invention water is removed from the cargo space, for example from its lower part, during collecting at least in the same amount as the water and material to be collected, which flows into the cargo space. Typically thus the surface of the material in the cargo space and the surface of the water system outside the device remain essentially on the same level. Water can be removed from the cargo space for example with pumps. It is also possible that there are openings in the bottom of the cargo space, from which water can exit due to the dynamic pressure formed in the cargo space. The power of the pumps and the size of the openings can also be adjusted. Material to be collected, which floats in such a device, is concentrated in the top part of the cargo space. When the collecting is stopped, the intake opening can be closed and the pumps which remove water from the cargo space can be stopped or the possible closing hatches of the openings can be closed. Thus the device can for example be transported to the shore for further processing.

According to an embodiment of the invention the cargo space is as the one described in publications FI20040062 or WO 2007/010086.

According to an embodiment of the invention the intake opening is partly above the water surface of the water system when collecting oil with the device. The bottom edge of the intake opening can thus be arranged at a preferable height in relation to the water surface of the water system, for collecting oil from the water surface.

According to an embodiment of the invention the support part is a watertight bow door of the device, which in a collecting situation can be opened either completely or partly. The support part can be lowered to open the intake opening and lifted in front of the intake opening to close it. Thus the bow door is also typically the front wall of the cargo space. Thus, when the bow door opens, the surface of the water system and material therein to be collected can pass directly from the water system into the cargo space.

According to an embodiment of the invention the support part and/or the separating grate do not collect oil, when turned up, for example against the side of the device or in the bow of the device, when the device travels or it is transported in the water system. The support part and/or the separating grate can be lowered and adjusted into suitable positions for example only when the collecting of oil is started.

According to an embodiment of the invention, by setting the position of the support part as desired, the collecting depth of the device and/or the size of the intake opening can be set as desired. For example, if the support part functions as the bow door or the like of the vessel, it can simultaneously function as the closing means of the intake opening.

According to an embodiment of the invention the intake opening, the separating grate and the support part are arranged to the side of the cargo space in relation to the travel direction of the device.

According to an embodiment of the invention the separating grate comprises rails arranged at a distance from each other, so that there is free space between the rails. When pushing ice blocks with the separating grate beneath the water surface of the water system, oil can rise between the rails and at least a part of the oil remains on the water surface. Oil left on the water surface can with the aid of the flow of the water be steered onward into the cargo space. The rails can in the separating grate be for example mainly parallel and/or at least a part of the rails can be arranged diagonally, for example in a v-shape. For example with the aid of rails arranged diagonally in a v-shape in the rear of the separating grate, ice blocks can be plowed to the sides of the separating grate. The rails can for example be of steel. The structure of the rails can for example be of O-profile, i.e. hollow beam, the size of which depends on what kind of conditions it is made for. The height of the hollow beam can for example be 30 cm or 10-40 cm, the width 15 cm or 5-20 cm and the thickness of the wall 3-10 mm or 6-8 mm. Hollow beam is for the invention a preferable material for example for the reason that it has stiffness properties in all directions. The oil collecting conditions determine the preferable size of the rails. For example in a sea lane the separating grate must weigh several tons, before it can push ice blocks beneath the water surface with its own weight. The length of the rails can be for example 5-30 m. The distance between the rails can be for example 5 cm, 15 or 20 cm or 5-20 cm or 10-20 cm. For example in an arctic area, where ice blocks can have a diameter of several meters and there is only a little ice sludge in the water system, the distance between the rails can be 15-20 cm.

According to an embodiment of the invention the rails are arranged in the separating grate at least mainly parallel in relation to the travel direction of the device.

According to an embodiment of the invention screw-like threads have been arranged in the rails. The screw-like threads can be arranged in the rails so that they are below the separating grate when collecting oil. The screw-like threads can for example be quite sparse screw threads and/or half screw threads. The diameter of the screw-like threads can be for example 50-100 cm, 25-50 cm when split. With the aid of the screw-like threads arranged in the rails, ice blocks can be made to turn in the cold water. By turning the ice blocks in the cold water, the detaching of the oil can be made more effective. With the aid of the screw-like threads oil can also be scraped from the surface of the ice blocks.

According to an embodiment of the invention the screw-like threads can be attached for example in the spaces between the hollow beams of the separating grate, whereby they support the separating grate against loads from the side.

According to an embodiment of the invention, screw-like threads have been arranged in the separating grate, the direction of which threads is such that they steer ice blocks arriving at the center of the separating grate to the sides of the separating grate and gradually completely from under the separating grate to outside of it.

According to an embodiment of the invention screw-like threads have been arranged in the rails in groups, so that in the front end of the separating grate the threads steer ice blocks toward the center of the separating grate and in the rear part of the separating grate the structure of the threads steers the ice blocks toward the sides of the separating grate. Thus also the rubbing effect of the threads on the ice blocks and the flushing effect of the water can be increased, before the ice blocks are steered out from under the separating grate, at the same time preventing the packing of ice blocks under the separating grate. In the front end of the separating grate there can be threads over a distance of for example 2 meters, whereby these threads steer ice blocks toward the center of the grate. After the threads in the front end there can be empty space for example 2 meters, and after that there can be threads arranged in the separating grate, which steer the ice toward the outer edges of the separating grate.

According to an embodiment of the invention, rails are arranged in the separating grate diagonally in a v-shape and screw threads are arranged in the rails. The direction of the rails and the screw threads are preferably such that ice blocks are steered toward the outer edges of the separating grate in the rear of the separating grate.

The device according to an embodiment of the invention comprises steering means for steering the oil into the cargo space when the device is mainly immobile in relation to the bottom of the water system. By arranging steering means in the device, oil can be collected also when the device is immobile. Thus it is possible to intensify oil collecting in a certain area. The steering means can for example be suitable pumps, pipes, tubes, hoses or nozzles for directing a water jet. The steering means can comprise one or several pumps, with which water is removed from the cargo space, whereby a flow is achieved from the intake opening, even if the device were mainly immobile in relation to the surrounding water system.

According to an embodiment of the invention, at least a part of the rails or at least of the screw-like threads arranged therein are arranged to rotate around the longitudinal axis of the rail or the axis of the screw. The rails or screw-like threads can be fitted with a bearing to the rest of the separating grate for example at their ends. The screw-like thread can be arranged to be sleeve-like around the rail or other support or to rotate in relation to this support. The rotating of the rail or screw-like thread can be free or the rotating can be arranged to be used for example with a hydraulic or electric motor. The rotation direction and/or speed can be adjustable for example by remote use. With the rotation, the movement of the ice and the detaching of the oil from the ice can be intensified.

According to an embodiment of the invention oil is collected when the device is mainly immobile in relation to the bottom of the water system. According to the embodiment, ice blocks are pushed under the water surface with the separating grate in stage 1 and the oil is expected to detach from the ice blocks, because it is lighter than the water, and rise to the water surface. In stage 2 of the embodiment the oil is steered with the steering means, such as pumps, into the cargo space. Next the device can be moved to a new place, where the stages 1 and 2 are repeated.

The device according to an embodiment of the invention comprises power means for moving the support part and/or the separating grate in relation to the level of the water surface of the water system and thus for pushing ice blocks at least partly beneath the water surface of the water system. The power means can for example be hydraulic cylinders and the actuators they require. With the aid of the power means the support part and/or the separating grate are adjusted into a suitable collecting position.

In an embodiment of the invention the device comprises floatable elements, the buoyancy of which can be arranged as desired in order to adjust the draught of the device. The floatable elements can comprise for example one ballast tank and means, such as pumps and necessary power sources, for filling and emptying the ballast tank. There can be several ballast tanks.

The device according to an embodiment of the invention comprises ballast tanks for controlling the draught of the cargo space and/or means for removing water from the cargo space and/or means for controlling the water removal means.

The device according to the invention can comprise one or several separating grates and support parts. A separating grate and support part can for example be arranged on each side of the cargo space. Additionally several devices according to the invention can be arranged in connection with a watercraft. The devices can be arranged side by side, for example one or several cargo spaces on each side of a towboat or other equivalent vessel. By arranging several separating grates, support parts and/or intake openings in the device, and/or by arranging several devices according to the invention in a watercraft, a larger sweeping area is obtained, whereby the collecting of oil from the water system can be intensified.

The embodiment examples and advantages mentioned in this text are in suitable parts applicable to both the device and the method for collecting oil from a water system according to the invention, even if this is not always specifically mentioned.

BRIEF DESCRIPTION OF THE FIGURES

The invention is described in more detail below with reference to the enclosed schematic drawing, in which.

DETAILED DESCRIPTION OF THE EXAMPLES OF THE FIGURES

For the sake of clarity, corresponding parts of different applications have the same reference numeral. The level of the water surface of the water system is in all figures drawn with a solid line WL.

Figure 1:
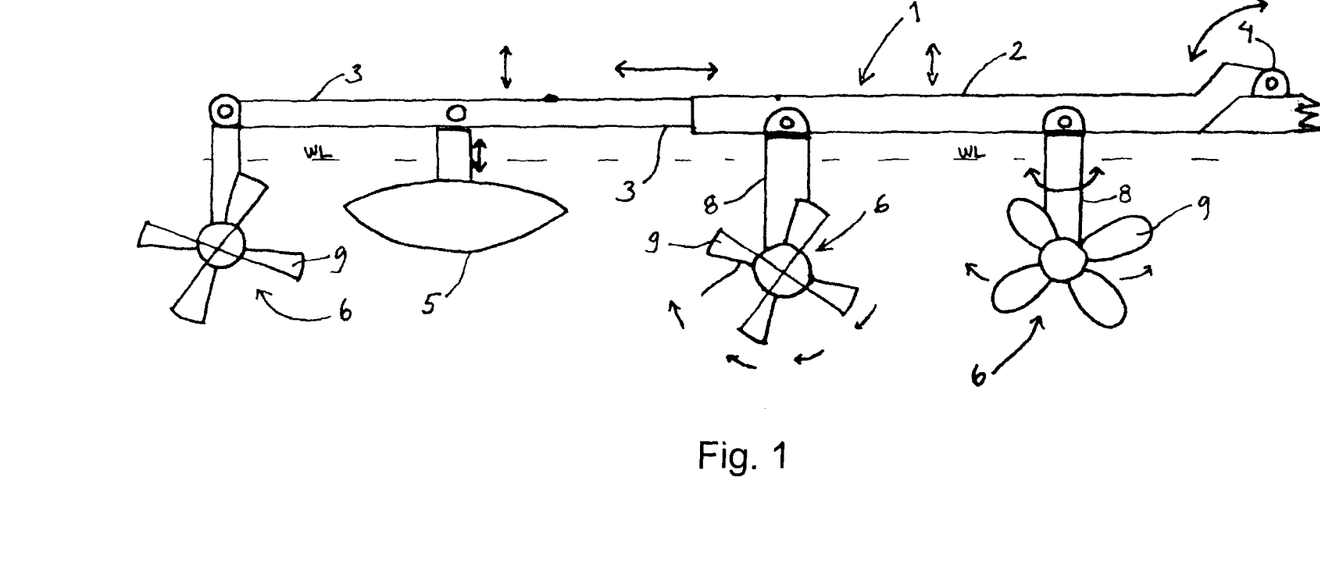
FIG. 1 shows an oil combatting boom according to an embodiment of the invention

FIG. 1 shows an oil combatting boom 1 according to an embodiment of the invention. The oil combatting boom 1 comprises a boom part 2 and an extension part 3. A joint 4 has been arranged in the first end of the boom part, with the aid of which joint the boom part is connectable to the oil combatting vessel. The length of the oil combatting boom 1 is about 30 meters. The length of the extension part 3 is about 10 meters. A pontoon member 5 has been arranged in connection with the extension part 3 for floating the oil combatting boom 1 at a suitable height in the water system. In a normal use situation the boom part 2 and the extension part 3 of the oil combatting boom are clearly above the water line WL. Transfer members, i.e. propeller members 6, have additionally been arranged in the oil combatting boom 1. Hydraulic motors for rotating the blade members, i.e. the propeller blades 9, have been arranged in connection with the propeller members 6. Hydraulic power means for turning have further been arranged in connection with the propeller member 6. A ball joint has been arranged between the shaft of the propeller member 6 and the boom 1, so that the propeller member can be turned 180 degrees in both directions. The propeller member is further arranged to be turnable at the connection point between the propeller member and its shaft by about 90 degrees. The propeller member 6 can further be turned in a vertical direction up- or downwards by 20-30 degrees. The rotation direction of the propeller blades 9 can further be changed. The rotation speed of the propeller blades 9 can be adjusted in a stepless manner between 0-100 revolutions per minute. At such low rotation speeds the formation of unwanted water-oil emulsion can be avoided. By turning the propeller member 6 and changing the rotation direction of the propeller blades 9 when needed, oil can be steered from a land area in a desired direction and further an appropriate surface flow can be arranged in the water system, for steering the oil into the collecting space of the oil combatting vessel. By turning the propeller member 6 in a vertical direction, the oil combatting boom can further be carried when needed. The blades 9 of the propellers of the propeller members 6 of the extension part 3 are manufactured from a flexible material. Flexible blades 9 intensify the scraping of oil from a land area. The blades 9 of the propellers of the propeller members 6 of the boom part 2 are rigid. Suitable surface flows are created in the water system with the aid of the rigid blades 9. The diameter of the propeller blades 9 of the propeller members 6 is about 1 meter. The boom part 2 is equipped with hydraulic power means. The boom part 2 and the extension part 3 can be moved with the aid of the hydraulic power means in a horizontal and vertical direction. Both the boom part 2 and the extension part 3 are manufactured from steel. The extension part 3 is telescopic. Due to the telescopic extension part 3, the length of the oil combatting boom 1 can be adjusted. Sliding pads make possible the sliding together and apart of the propeller members 6. When the extension part 3 of the oil combatting boom 1 is retracted into the boom part 2, the propeller members 6 and the pontoon member 5 of the extension part slide along it to the end toward the boom part. When the total length of the oil combatting boom 1 is increased by brining the extension part 3 out from inside the boom part 3, the propeller members 6 and the pontoon member 5 diverge from each other by sliding along the extension part 3.

Figure 2:
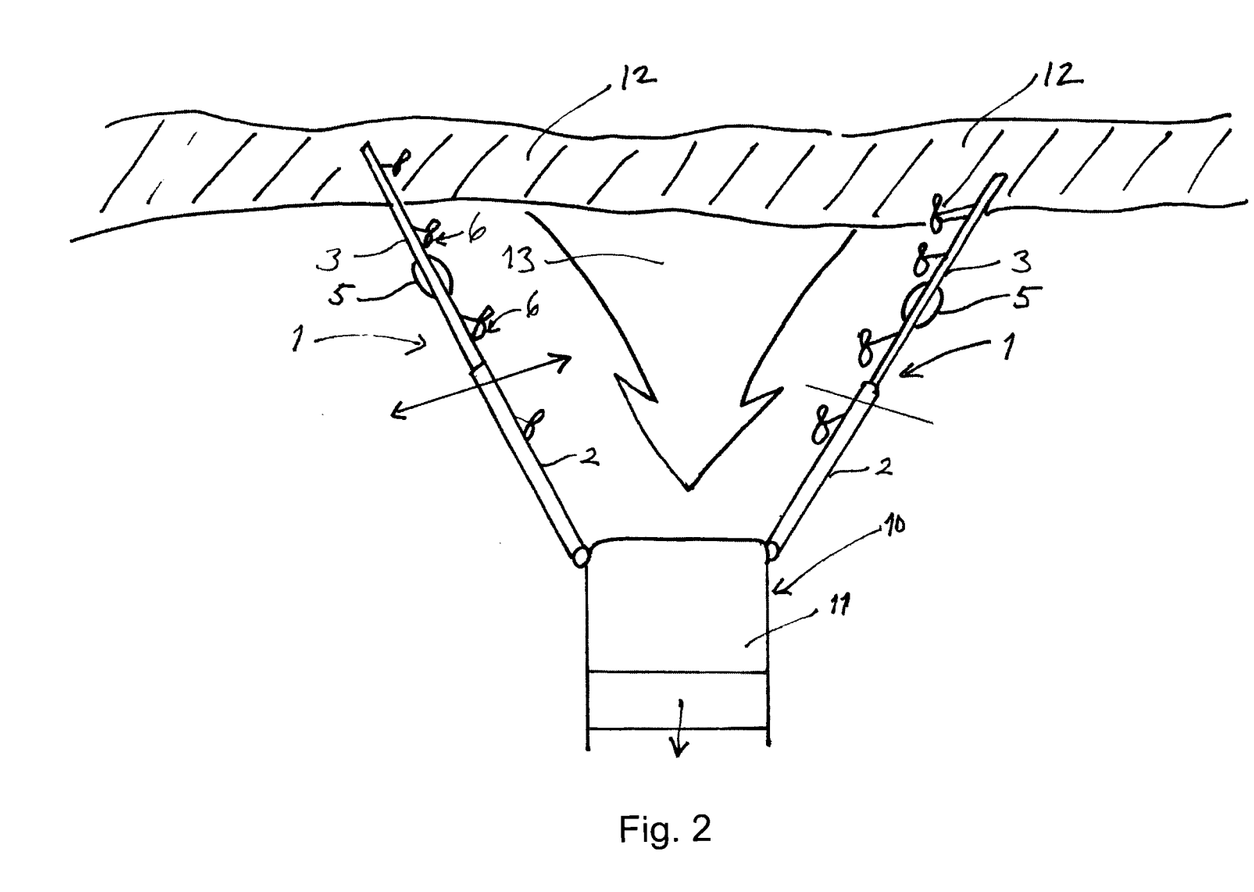
FIG. 2 shows an oil combatting vessel according to an embodiment of the invention in an oil collecting situation, where the oil combatting vessel is immobile in the water system during the collecting

FIG. 2 shows an oil combatting vessel 10 according to an embodiment of the invention in an oil collecting situation, where the oil combatting vessel 10 is immobile in the water system during the collecting. The oil combatting vessel 10 is situated close to the shore of a water system. Two oil combatting booms 1 have been pivotably connected to the oil combatting vessel 10. The oil combatting booms 1 comprise a boom part 2 and an extension part 3. A pontoon member 5 has been arranged in connection with the extension part 3 for floating the oil combatting booms 1 at a suitable height in the water system. The oil combatting booms 1 are situated on the shore area, so that the extension parts 3 reach the polluted land area 12. Transfer members, i.e. propeller members 6, have been arranged in connection with both the boom parts 3 and the extension parts 2. Hydraulic motors have been arranged in the axes of the propeller members 6. The blade members of the propeller members 6 in connection with the extension parts 3, i.e. the propeller blades 9, are arranged in such a position that they transfer oil from the land area into the water system when they rotate. The propeller blades of the propeller members 6 in connection with the boom parts 3 create such surface flows in the water system when they rotate that oil 13 is steered toward the collecting space 11. The oil combatting booms 1 are moved with the aid of hydraulic power means, sideways in the manner indicated by the arrows, for intensifying the oil collecting.

Figure 3:
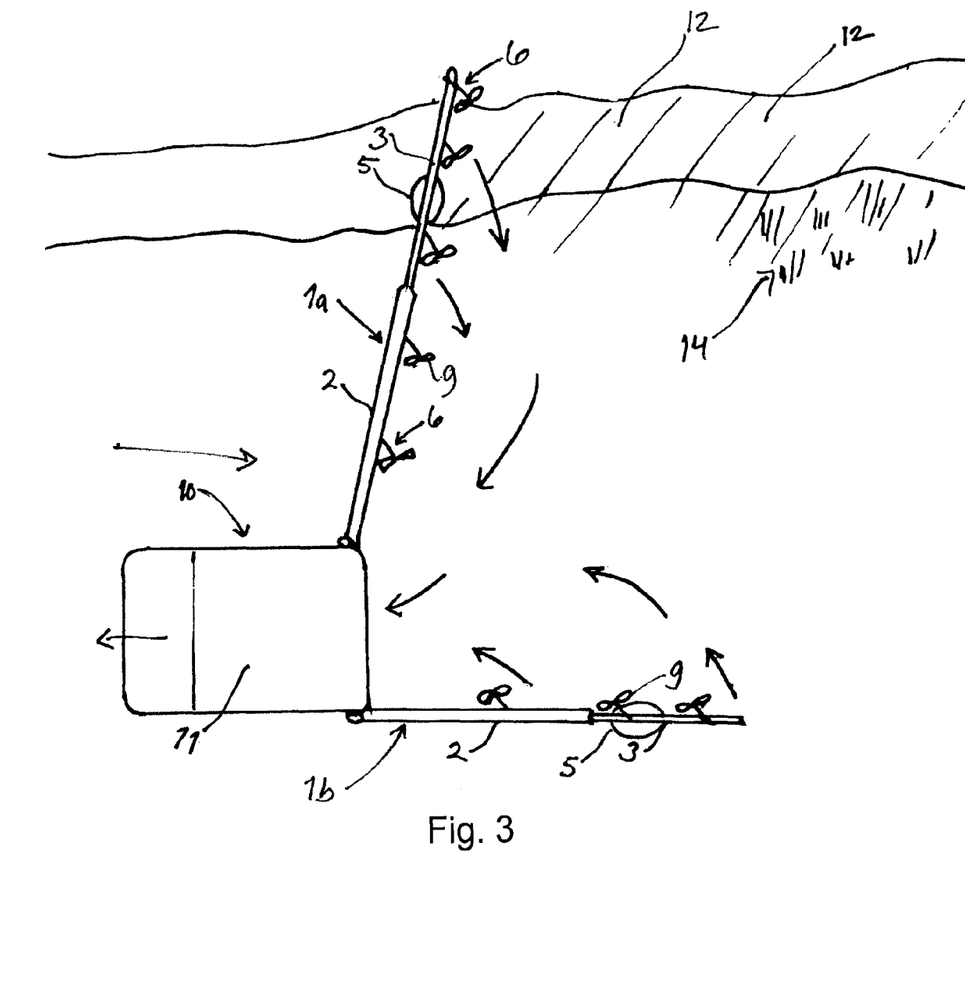
FIG. 3 shows an oil combatting vessel according to an embodiment of the invention in an oil collecting situation, where the oil combatting vessel moves along the shoreline

FIG. 3 shows an oil combatting vessel 10 according to an embodiment of the invention in an oil collecting situation, where the oil combatting vessel 10 moves along the shoreline during the collecting. Two oil combatting booms 1 have been pivotably connected to the oil combatting vessel 10. The oil combatting booms 1 comprise a boom part 2, an extension part 3 and a pontoon member 5 arranged in connection with the extension part 3 for floating the oil combatting booms 1 at a suitable height in the water system. The first oil combatting boom 1a is arranged with hydraulic power means in such a position that the extension part 2 extends at least partly onto the polluted land area 12. Transfer members, i.e. propeller members 6, have been arranged at five meter intervals in connection with the extension part 3 of the first oil combatting boom 1a. The blade members of the propeller members 6 of the part 3 of the oil combatting boom, which extends onto the land area, i.e. the propeller blades 9, scrape oil from the ground 12 when rotating. The propeller blades 9 are arranged in such a position that the transfer oil from the land area 12 into the water system when they rotate. The propeller blades 9 of the first oil combatting boom 1a, which are in the water system, are arranged in such a position that they create surface flows when they rotate, which steer the oil toward the collecting space. The second oil combatting boom 1b is arranged approximately parallel with the shoreline. The propeller blades 9 of the propeller members 6 arranged in connection with the extension part 3 and the boom part 2 of the second oil combatting boom 1b are arranged in such a position that they create surface flows in the water system when they rotate, which steer oil from the water system into the collecting space 11. Water is removed from the rear part of the collecting space 11. Polluted vegetation 14 is cut with the aid of the propeller blades 9 of the extension part 3 of the first oil combatting boom 1a and steered with the aid of the surface flows created with the propeller blades 9 onward into the collecting space 11. The polluted vegetation 14 is baled or put in sacks in the oil combatting vessel 1 in order to increase the transport capacity.

Figure 4:
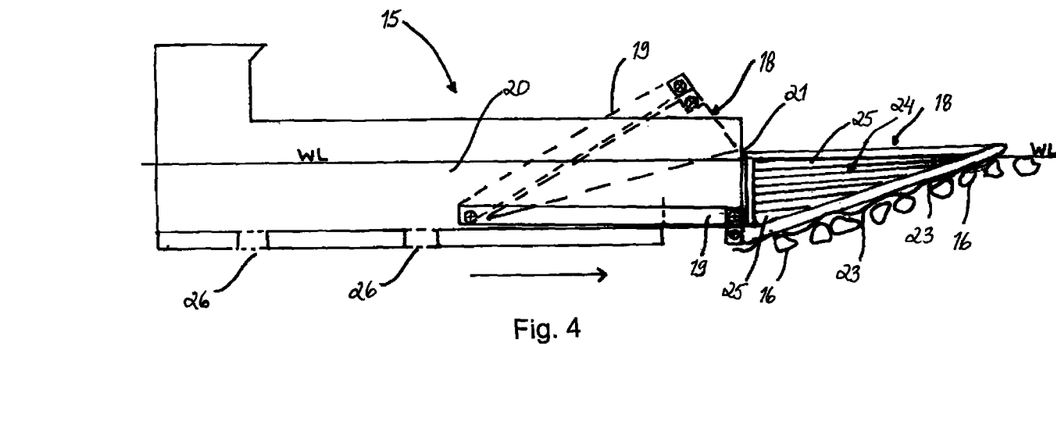
FIG. 4 shows a cross-section of a device according to the invention as seen from the side

FIG. 4 shows as a cross-section a collecting vessel 15 in a water system, the draught and simultaneously the height of the water in the cargo space 20 of which vessel is indicated by the solid line WL. A support part 19 has been pivotably connected to the vessel 15. A separating grate 18 has been pivotably connected to the support part 19. The support part 19 and separating grate 18 have been shown in the transfer position with dotted lines in the figure. The watertight support part 19, which functions as a bow door, is thus lifted in front of the intake opening 21 of the cargo space 20, so that the intake opening 21 is at least partly closed with the support part 19. The separating grate 18, which is attached with joints to the support part 19, is folded in connection with the support part. The support part 19 and separating grate 18 can be held in this position when the vessel 15 travels toward an oil damage site. The position of the support part 19 and the separating grate 18 when collecting oil has been shown with solid lines in the figure. The support part 19 is lowered below the water surface WL, to be essentially parallel with the water surface WL of the water system. The separating grate 18 is folded in front of the intake opening 21 of the cargo space 20 of the vessel 15, in a suitable position in relation to the water surface WL of the water system. The separating grate 18 pushes ice blocks 16 beneath the water surface WL. The ice blocks 16 turn when they are pushed downward due to the screw-like threads 23 attached to the separating grate 18. The screw-like threads 23 are arranged in groups, so that in the front end of the separating grate 18 the threads steer the ice blocks 16 toward the center of the separating grate 18 and in the rear part of the separating grate 18 the structure of the threads 23 steer them toward the edges of the separating grate 18. Thus also the rubbing effect of the threads 23 on the ice blocks 16 and the rinsing effect of the water can be increased, before the ice blocks 16 are steered out from under the separating grate 18, at the same time preventing the packing of ice blocks 16 under the separating grate 18. Mainly vertical brinks 24 have further been arranged on both sides of the separating grate 18. The upper edge of the brinks 24 extends above the water surface WL of the water system. The structure of the brinks 24 is the same as the bottom of the separating grate 18 and they let the oil flow through the gaps 25 in the brinks into the cargo space 20, but prevent the ice blocks 16 from returning onto the separating grate 18 and from there into the cargo space 20. The separating grate 18 is dimensioned according to the width of the cargo space, so that ice blocks 16 cannot get into the cargo space 20 from the sides of the separating grate, around the brinks 24 of the separating grate. There are exit openings 26 for water in the bottom of the cargo space 20. The travel direction of the vessel 15 is indicated with arrows in the figure.

Figure 5:
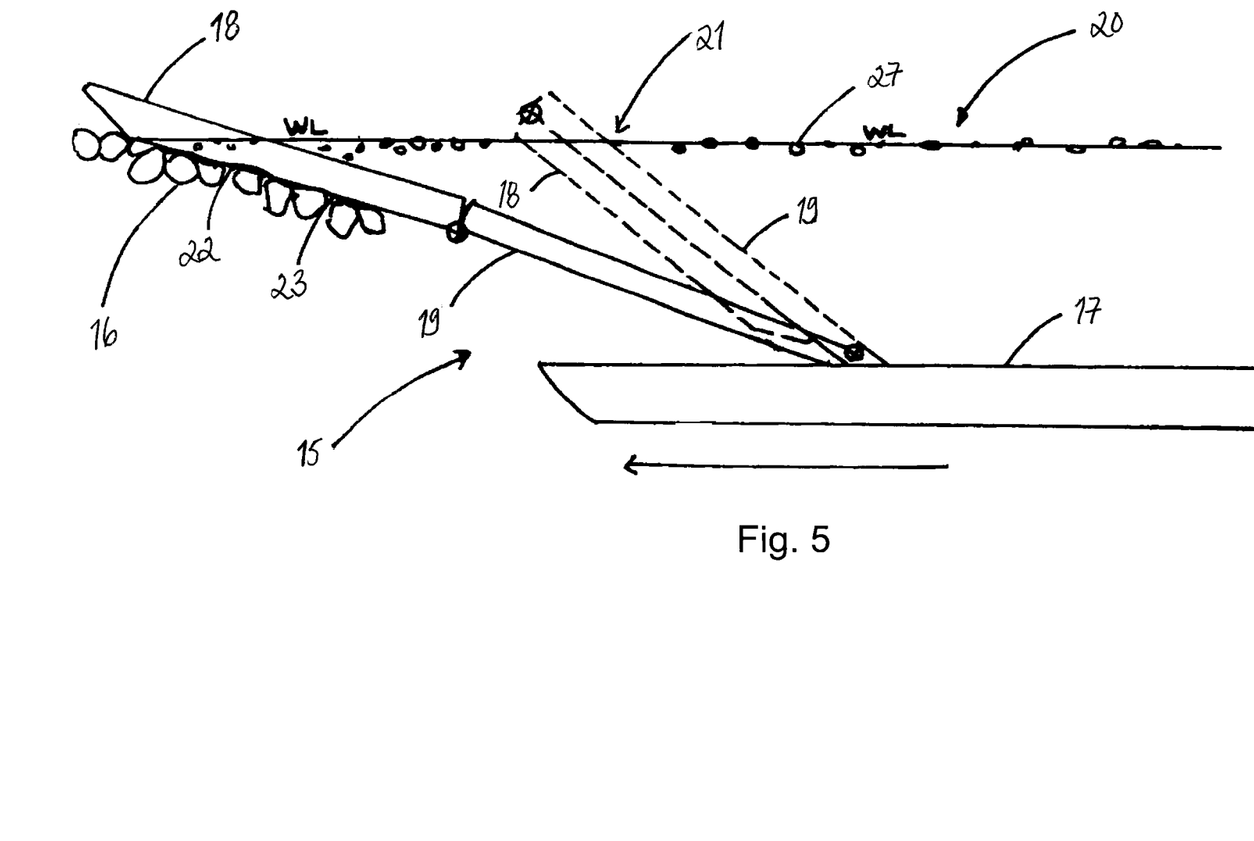
FIG. 5 shows a cross-section of a device according to the invention as seen from the side

FIG. 5 shows as a cross-section, seen from the side, a part of a cargo space 20 according to the invention floating on the water surface WL of a water system and a support part 19 pivotably connected to the cargo space 20 and a separating grate 18 pivotably connected to the support part. In the cargo space 20, the level of the water surface WL inside and outside of the cargo space 20 is drawn. The intake opening 21 is partly below the water surface WL and partly above the water surface WL in order to collect oil into the cargo space 20. The support part 19 shown in dotted lines is folded to make up the bow door 19 of the device, and the separating grate 18 shown in dotted lines is folded in front of the bow door 5. The support part 5 shown in solid lines is lowered beneath the water surface WL and the separating grate 18 shown in solid lines is at the water surface at such a height and at such an angle, that the ice blocks are steered downwards beneath the water surface along the rails 22 of the separating grate 18. The rails 22 of the separating grate 18 have screw-like threads 23, which scrape and turn the ice blocks 16 and move them from underneath the separating grate 18 gradually outside the separating grate 18.

When transporting the device 15 or when the device 15 travels toward an oil damage site, the support part 19 is lifted to form a bow door 19 in front of the intake opening 21. The separating grate 18 is folded in front of the support part 19 and the device 15 thus has a smaller water drag when travelling. When arriving at the oil damage site the support part 19 is lowered beneath the water surface WL. The separating grate 18 is lowered to the level of the water surface. The relative position of the support part 21 and the separating grate 18 is adjusted to be suitable for the collecting, so that the ice blocks 16 slide below the separating grate 18 and the water surface WL with as little resistance as possible. The oil detaching from the surface of the ice blocks 16, due to its lower inherent weight, rises from the gaps between the rails 22 in the separating grate 18 to the water surface along with the rest of the oil and drifts with the water into the cargo space 20. In order to detach the oil from the surface of the ice blocks 16, the rails 22 of the separating grate further has screw-like threads 23, due to which the ice blocks 16 turn in the cold water. The oil which has ended up above the separating grate 18 drifts with the water into the cargo space 20 of the device 15. The device 15 travels forward, whereby oil is steered into the cargo space 20 as a result of the movement of the device 15. The device 15 can alternatively be immobile, whereby oil can be steered into the cargo space 20 for example by removing water from the cargo space with pumps. The device 15 can then be moved forward for example as far as the dimension of the separating grate and the oil collecting can be started again by pushing the ice 16. The ice 27, which has ended up in the cargo space 20 along with the collected oil and water melts during the collecting, due to the effect of the water flowing back into the sea through the cargo space 20.

Figure 6:
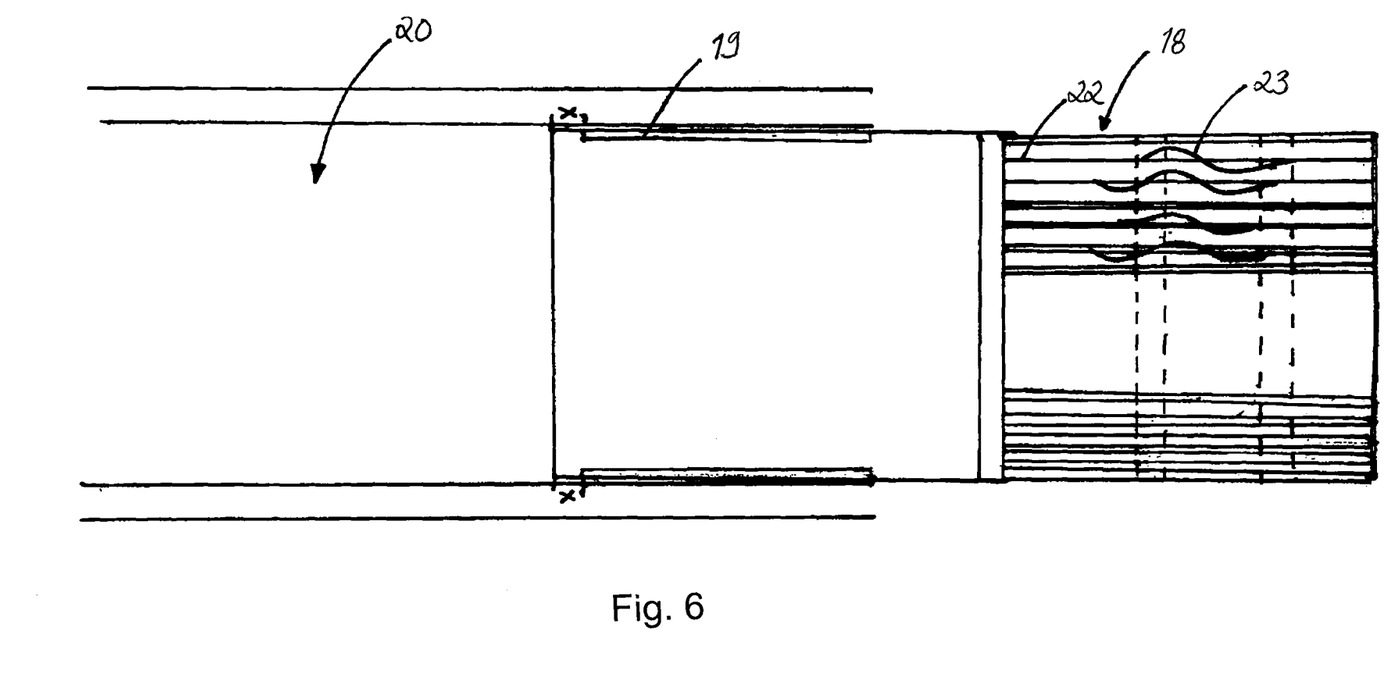
FIG. 6 shows a cross-section of a device according to the invention as seen from above

FIG. 6 shows a cross-section of a part of a device 15 according to the invention, seen from above. The support part 19 is pivoted in the vicinity of the intake opening 21 of the cargo space 20. A separating grate 18, which comprises rails 22, has been pivotably connected to the support part 19. The rails in the separating grate 18 have quite sparse screw-like threads 23. The rails 22 or the screw-like threads 23 can be freely rotating or they may be rotated mechanically around their longitudinal axis.

Only a few preferred embodiments of the invention are presented in the figures. Facts of secondary importance regarding the main idea of the invention, facts known as such or evident for a person skilled in the art, such as power sources, pumps, support structures possibly required by the invention or attaching mechanisms, are not separately shown in the figures. It is apparent to a person skilled in the art that the invention is not limited exclusively to the examples presented above, but that the invention can vary within the scope of the claims presented below. The dependent claims present some possible embodiments of the invention, and they are not to be considered to restrict the scope of protection of the claims as such.

The invention claimed is:

1. An oil combatting boom comprising:
   an elongated boom part having a first end connectable to an oil combatting vessel and a second end distal to the first end,
   at least one pontoon member attached to the elongated boom part to provide flotation to the elongated boom part on a water system, and
   a number of turnable transfer members operably attached to the elongated boom part, wherein
   the transfer members include rotatable blade members, and wherein
   the blade members of at least some of the transfer members are formed of a flexible material.

2. The oil combatting boom according to claim 1, further comprising an extension part at least partly arranged inside the boom part in a telescopic manner at the second end thereof.

3. The oil combatting boom according to claim 2, wherein the extension part includes at least one pivot point to allow the extension point to be pivotally movable in a vertical direction.

4. The oil combatting boom according to claim 1, wherein the boom part includes at least one pivot point to allow the boom part to be pivotally movable in a vertical direction.

5. The oil combatting boom according to claim 1, wherein the boom part includes a power device for moving the boom part.

6. The oil combatting boom according to claim 1, wherein the transfer member has a substantially horizontal axis.

7. An oil combatting vessel which includes at least one oil combatting boom according to claim 1.

8. A method for collecting oil from an oil-polluted shore area, wherein the method comprises:
   (a) equipping an oil combatting vessel with an oil combatting boom according to claim 1;
   (b) steering the oil combatting vessel equipped with the oil combating boom into a vicinity of the oil-polluted shore area,
   (c) extending the oil combatting boom to the oil-polluted shore area,
   (d) transferring oil from the shore area into the water by rotating the blade members of the transfer members, and
   (e) steering the oil in the water toward a final collection space by rotating the blade members.

9. The method according to claim 8, which comprises simultaneously steering the oil combatting vessel to travel along the shore area, and continuously transferring oil from the shore area into the water.

10. The method according to claim 8, which comprises cutting down oil-polluted vegetation growing in the water close to the shore area or in the shore area by rotating the blade members of the transfer members, transferring and cut vegetation into the water together with the oil, and thereafter moving the cut vegetation and the oil toward the final collection space.

11. The oil combatting boom according to claim 1, the transfer members positioned farthest from the first end of the boom part include blade members formed of a flexible material.

12. The oil combatting boom according to claim 11, wherein the transfer members positioned closest to the first of the boom part include blade members formed of an inflexible material.

* * * * *